US012085400B2

(12) United States Patent
Ozturk

(10) Patent No.: US 12,085,400 B2
(45) Date of Patent: Sep. 10, 2024

(54) ROUTING SYSTEM THAT INCORPORATES HOURS OF SERVICE INTO TIME ESTIMATES

(71) Applicant: RM ACQUISITION, LLC, Skokie, IL (US)

(72) Inventor: Yusuf Ozturk, Wilmette, IL (US)

(73) Assignee: RM ACQUISITION, LLC, Chicago, IL (US)

( * ) Notice: Subject to any disclaimer, the term of this patent is extended or adjusted under 35 U.S.C. 154(b) by 98 days.

(21) Appl. No.: 16/885,095

(22) Filed: May 27, 2020

(65) Prior Publication Data

US 2021/0372806 A1 Dec. 2, 2021

(51) Int. Cl.
*G01C 21/34* (2006.01)
*G01C 21/36* (2006.01)
*G07C 5/02* (2006.01)

(52) U.S. Cl.
CPC ..... *G01C 21/3484* (2013.01); *G01C 21/3691* (2013.01); *G01C 21/3697* (2013.01); *G07C 5/02* (2013.01)

(58) Field of Classification Search
CPC ............ G01C 21/3484; G01C 21/3691; G01C 21/3697; G01C 21/3682; G01C 21/3407; G01C 21/3685; G07C 5/02; G07C 5/008; G07C 5/085
See application file for complete search history.

(56) References Cited

U.S. PATENT DOCUMENTS

| | | | |
|---|---|---|---|
| 9,792,575 B2 | 10/2017 | Khasis | |
| 9,921,070 B1 | 3/2018 | Nimchuk et al. | |
| 10,012,998 B2 | 7/2018 | Nimchuk et al. | |
| 10,260,893 B2 | 4/2019 | Nimchuk et al. | |
| 10,354,217 B2 | 7/2019 | Khasis | |
| 10,415,988 B2 | 9/2019 | Emory et al. | |
| 2003/0167120 A1* | 9/2003 | Kawasaki | G01C 21/3682 701/426 |

(Continued)

OTHER PUBLICATIONS

PC*MILER 31 User Guides: PC*MILER|Connect User's Guide (Modified on Jan. 15, 2018) (Year: 2018).*

(Continued)

*Primary Examiner* — James J Lee
*Assistant Examiner* — Wenyuan Yang
(74) *Attorney, Agent, or Firm* — MARSHALL, GERSTEIN & BORUN LLP

(57) ABSTRACT

Techniques for notifying a driver of locations at which the driver can stop to comply with hours of service (HOS) rules are provided. In some examples, a navigation application compares the amount of time a driver has driven a vehicle to HOS rules to determine the remaining time the driver may drive before violating the rules, and identifies potential rest stops reachable within the remaining time and displays the rest stops to the driver. In some examples, the navigation application predicts an amount of time it will take a driver to drive a generated route and compares the predicted time to HOS rules to determine a number or frequency of rest stops needed for the driver to comply. Based on the number or frequency of rest stops, the navigation application identifies potential rest stops near the route and displays the rest stops to the driver without altering the route.

23 Claims, 5 Drawing Sheets

(56) References Cited

U.S. PATENT DOCUMENTS

| | | | |
|---|---|---|---|
| 2005/0102102 A1* | 5/2005 | Linn | G01C 21/3682 |
| | | | 701/411 |
| 2012/0072109 A1* | 3/2012 | Waite | G01C 21/3484 |
| | | | 701/431 |
| 2016/0011001 A1* | 1/2016 | Emory | G01C 21/3407 |
| | | | 701/465 |
| 2016/0258767 A1* | 9/2016 | Nevrekar | G01C 21/3682 |
| 2017/0154394 A1 | 6/2017 | Kan et al. | |
| 2017/0219361 A1* | 8/2017 | Mays | G01C 21/3685 |
| 2017/0261330 A1* | 9/2017 | Zhou | G01C 21/3469 |
| 2018/0080777 A1* | 3/2018 | Nimchuk | G01C 21/3415 |
| 2018/0081374 A1* | 3/2018 | Nimchuk | G06Q 10/02 |
| 2019/0325376 A1 | 10/2019 | Khasis | |
| 2019/0360832 A1 | 11/2019 | Emory et al. | |
| 2020/0410861 A1* | 12/2020 | Nellros | G08G 1/143 |

OTHER PUBLICATIONS

PC*MILER 31 User Guides: PC*MILER for Windows User Guide (Modified on Jan. 15, 2018) (Year: 2018).*

* cited by examiner

ROUTING SYSTEM THAT INCORPORATES HOURS OF SERVICE INTO TIME ESTIMATES

FIELD OF THE DISCLOSURE

The present disclosure generally relates to navigation software applications and, more particularly, to a navigation software application that incorporates hours of service (HOS) requirements.

BACKGROUND

Commercial long haul drivers are required to follow hours of service (HOS) rules established by federal and state authorities. The HOS rules, among other things, specify how many hours a driver can drive, e.g., how many consecutive hours the driver can drive, or how many total hours the driver can drive over the course of a longer period of time, such as over one day, over several days, over one week, etc. In order to comply with HOS rules, a driver must stop periodically so as not to drive more hours than allowed by the rules. However, long haul routes may sometimes take a truck driver through areas without frequent or otherwise obvious locations where the driver may safely and legally park and/or sleep, e.g., rural areas without frequent truck stops, gas stations, motels or other typical stops; urban areas without frequent parking lots able to accommodate a large vehicle; etc.

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

SUMMARY

Techniques for notifying a driver of locations at which the driver can stop in order to comply with hours of service (HOS) rules, e.g., via a navigation software application, are provided.

As discussed above, commercial long haul drivers are required to follow hours of service (HOS) rules established by federal and state authorities. The HOS rules, among other things, specify how many hours a driver can drive, e.g., how many consecutive hours the driver can drive, or how many total hours the driver can drive over the course of a longer period of time, such as over one day, over several days, over one week, etc. In order to comply with HOS rules, a driver must stop periodically so as not to drive more hours than allowed by the rules. Moreover, in addition to HOS rules established by federal and state authorities, commercial drivers, as well as non-commercial drivers, may be subject to additional driving rules and restrictions. For instance, some drivers (e.g., less experienced drivers or drivers with eyesight challenges) may be subject to rules limiting their driving to daylight hours only. Moreover, drivers with DUI violations may be required to stop at certain locations, or at certain intervals, to be checked (e.g., using a breathalyzer) or otherwise treated. Furthermore, some companies may require drivers to stop at specific locations for vehicle maintenance or training purposes.

In some examples, a navigation software application indicates locations of potential stops along an existing route generated for the driver, based on HOS or other driving rules (as discussed above) that apply to that driver. As used herein, the term "HOS rules" may include HOS rules as well as other driving rules as discussed above. For instance, the navigation software application may calculate a predicted number of hours it will take a driver to drive the existing route (e.g., based on speed limits for roads that are part of the route, a particular driver's known average driving speed, traffic conditions, weather conditions, etc.). Moreover, the navigation software application may compare the predicted number of hours it will take the driver to drive the existing route to HOS or other driving rules for that driver to determine if the driver needs to stop along the route, how many stops the driver needs to make, how the stops must be spaced, etc., to comply with the HOS or other driving rules. Furthermore, the navigation software application may analyze a database or other listing of locations where the driver's vehicle may safely and legally park and/or sleep to identify potential stops for the driver that are near or along the existing route where the driver could stop to comply with HOS or other driving rules. The navigation software application may display potential stops as a list, or as part of a map view, e.g., via a user interface display.

Additionally, in some examples, the navigation software application may analyze sensor data (e.g., motion sensor data or GPS data) to calculate an amount of time that a driver has been driving. In some examples, the navigation software application may receive other types of information for calculating an amount of time that a driver has been driving (e.g., a driver may manually indicate when he or she begins to drive and when he or she stops driving). For instance, based on the comparing the number of hours that the driver has been driving, the navigation software application may determine how soon the driver needs to stop to comply with HOS or other driving rules, and may generate recommended locations where the driver's vehicle may safely and legally park and/or sleep near the driver's current location. In some examples, the navigation software application may update a generated list of potential stops along a driver's existing route based on the number of hours driven (e.g., if the driver's actual driving time is different than his or her predicted driving time and causes the locations of potential stops for complying with HOS or other driving rules to change). Moreover, in some examples, even if the driver does not have an existing navigation route, the navigation software application may generate and display potential stops as a list, or as part of a map view, e.g., via a user interface display, based on the driver's current location and number of hours driven.

In one aspect, a computer-implemented method of notifying a driver of locations at which the driver can stop in order to comply with HOS rules is provided, the method comprising: calculating, by one or more processors, an amount of time that a driver has driven a vehicle; comparing, by the one or more processors, the amount of time that the driver has driven the vehicle to one or more HOS rules; determining, by the one or more processors, responsive to comparing the amount of time that the driver has driven the vehicle to the one or more HOS rules, a remaining amount of time that the driver can drive the vehicle before violating the one or more HOS rules; accessing, by the one or more processors, a listing of rest stops and respective locations associated with each rest stop of the listing of rest stops; identifying, by the one or more processors, one or more rest stops, of the listing of rest stops, associated with locations that the driver is predicted to reach within the remaining amount of time; and displaying, by the one or more processors, the identified rest stops via a user interface display.

In another aspect, a computer-implemented method of notifying a driver of locations at which the driver can stop in order to comply with HOS rules is provided, the method comprising: generating, by one or more processors, a route from an origin location to a destination location; accessing, by the one or more processors, a listing of rest stops and respective locations associated with each rest stop of the listing of rest stops; identifying, by the one or more processors, one or more rest stops, of the listing of rest stops, associated with locations within a threshold proximity of the generated route, at which the driver could stop in order to comply with one or more HOS rules; and displaying, by the one or more processors, the identified rest stops via a user interface display.

In still another aspect, a system for notifying a driver of locations at which the driver can stop in order to comply with HOS rules is provided, the system comprising: a user interface display; one or more processors configured to interface with the user interface display and one or more memories; and the one or more memories storing non-transitory computer-readable instructions that, when executed by the one or more processors, cause the one or more processors to: calculate an amount of time that a driver has driven a vehicle; compare the amount of time that the driver has driven the vehicle to one or more HOS rules; determine, responsive to comparing the amount of time that the driver has driven the vehicle to the one or more HOS rules, a remaining amount of time that the driver can drive the vehicle before violating the one or more HOS rules; access a listing of rest stops and respective locations associated with each rest stop of the listing of rest stops; identify one or more rest stops, of the listing of rest stops, associated with locations that the driver is predicted to reach within the remaining amount of time; and display the identified rest stops via the user interface display.

In another aspect, a system for notifying a driver of locations at which the driver can stop in order to comply with HOS rules is provided, the system comprising: a user interface display; one or more processors configured to interface with the user interface display and one or more memories; and the one or more memories storing non-transitory computer-readable instructions that, when executed by the one or more processors, cause the one or more processors to: generate a route from an origin location to a destination location; access a listing of rest stops and respective locations for each rest stop of the listing of rest stops; identify one or more rest stops, of the listing of rest stops, associated with locations within a threshold proximity of the generated route, at which the driver could stop in order to comply with one or more HOS rules; and display the identified rest stops via the user interface display.

In still another aspect, a non-transitory computer readable storage medium storing computer-readable instructions for notifying a driver of locations at which the driver can stop in order to comply with HOS rules is provided, that, when executed by one or more processors, cause the one or more processors to: calculate an amount of time that a driver has driven a vehicle; compare the amount of time that the driver has driven the vehicle to one or more HOS rules; determine, responsive to comparing the amount of time that the driver has driven the vehicle to the one or more HOS rules, a remaining amount of time that the driver can drive the vehicle before violating the one or more HOS rules; access a listing of rest stops and respective locations associated with each rest stop of the listing of rest stops; identify one or more rest stops, of the listing of rest stops, associated with locations that the driver is predicted to reach within the remaining amount of time; and display the identified rest stops via a user interface display.

In another aspect, a non-transitory computer readable storage medium storing computer-readable instructions for notifying a driver of locations at which the driver can stop in order to comply with HOS rules is provided, that, when executed by one or more processors, cause the one or more processors to: generate a route from an origin location to a destination location; access a listing of rest stops and respective locations for each rest stop of the listing of rest stops; identify one or more rest stops, of the listing of rest stops, associated with locations within a threshold proximity of the generated route, at which the driver could stop in order to comply with one or more HOS rules; and display the identified rest stops via a user interface display.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

Figure 1:
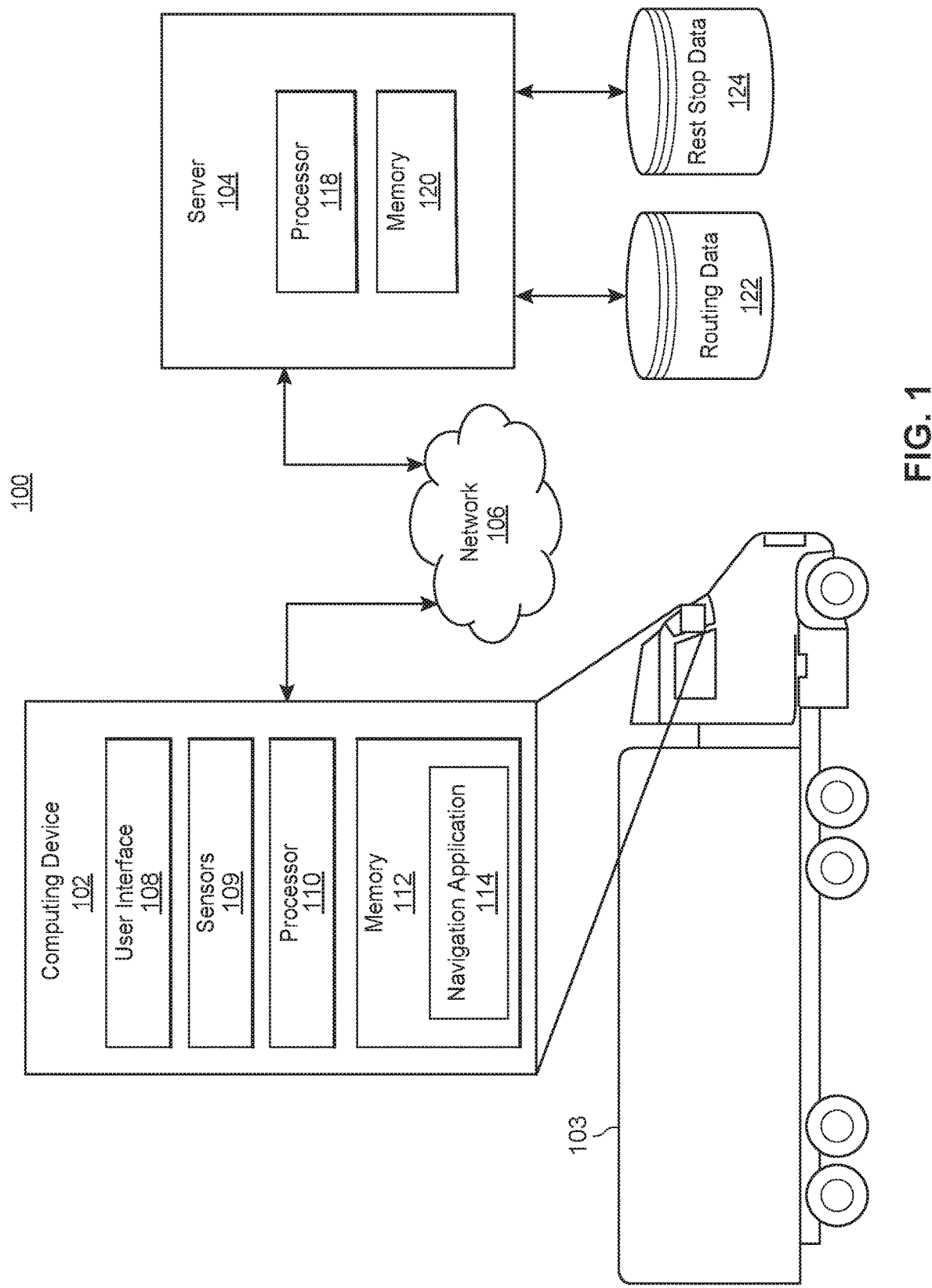
FIG. 1 is a block diagram illustrating an example system for notifying a driver of locations at which the driver can stop in order to comply with HOS rules, in accordance with some embodiments.

FIG. 1 is a block diagram illustrating an example system 100 for notifying a driver of locations at which the driver can stop in order to comply with hours of service (HOS) rules. The high-level architecture illustrated in FIG. 1 may include both hardware and software applications, as well as various data communications channels for communicating data between the various hardware and software components, as is described below. The system 100 may include a computing device 102 positioned within a vehicle 103, as well as a server 104. The computing device 102 may wirelessly communicate with the server 104 via a network 106.

The computing device 102 may be, e.g., a mobile computing device, such as a mobile phone, a tablet, etc., or a dedicated navigation computing device. Moreover, in some examples, the computing device 102 may be permanently installed within the vehicle 103 (which may be, e.g., an automobile such as a car, van, truck, semi-truck, etc.). Additionally, in some examples, the computing device 102 may be carried by a driver or passenger of the vehicle 103, and may be temporarily positioned within the vehicle 103 when the driver or passenger enters the vehicle.

The computing device 102 may include a user interface 108, one or more sensors 109 (e.g., motion sensors, location sensors, etc.), one or more processors 110, such as one or more microprocessors, controllers, and/or any other suitable type of processor. The computing device 102 may further include a memory 112 (e.g., volatile memory or non-volatile memory) accessible by the one or more processors 110 (e.g., via a memory controller).

The one or more processors 110 may interact with the memory 112 to obtain, for example, computer-readable instructions stored in the memory 110 for running a navigation application 114 stored in the memory configured to analyze data from the sensors 109 to notify a driver of locations at which the driver can stop in order to comply with HOS rules, e.g., via the user interface display 108. Additionally or alternatively, computer-readable instructions may be stored on one or more removable media (e.g., a compact disc, a digital versatile disc, removable flash memory, etc.) that may be coupled to the computing device 102 to provide access to the computer-readable instructions stored thereon.

In some examples, the navigation application 114 may generate a route from a current location or origin location to a destination location input by the user (e.g., via the user interface 108). For instance, various map data, navigation data, etc., may be stored in the memory 112, and the navigation application 114 may generate the route from the current location or origin location to the destination location based on the map data, navigation data, etc., stored in the memory 112. Moreover, in some examples, the navigation application 114 may request map data, navigation data, or even a fully generated route from the server 104, which may send map data and/or navigation data to the computing device, and/or generate the route and send the generated route to the computing device 102 (discussed in greater detail below with respect to the server 104). In any case, in some examples, the navigation application 114 may predict an amount of time it will take the driver to drive the vehicle 103 from the origin or current location to the destination location via a generated route.

Moreover, in some examples, whether or not a route is generated, the navigation application 114 may calculate the amount of time that a driver has driven the vehicle 103. For instance, in some examples, the navigation application 114 may calculate the amount of time that the driver has driven the vehicle 103 based on data from the sensors 109, such as motion sensor or location sensor data, indicative of the vehicle 103 being in motion, i.e., indicating that the driver is driving the vehicle 103. In some examples, the navigation application 114 may calculate the amount of time that the driver has driven the vehicle 103 based on an input from the driver, e.g., received via the user interface 108, indicating times when the driver starts or stops driving the vehicle 103.

The navigation application 114 may use these calculated and/or predicted amounts of driving time to determine when a user will need to stop in order to comply with HOS rules that restrict the amount of time that a driver may drive without stopping and/or restrict the total amount of time that a driver may drive in a given time period. Based on this determination, the navigation application 114 may identify locations of potential rest stops at which the driver could stop in order to comply with the HOS rules. In some examples, the memory 120 may store a listing of rest stops and their respective locations, and the navigation application 114 may access the listing of rest stops and their respective locations from the memory 120. Additionally or alternatively, in some examples, the navigation application 114 may request a listing of potential rest stops and their locations from a server 104, which may send a listing of potential rest stops to the computing device 102 (discussed in greater detail below with respect to the server 104). The navigation application 114 may predict an amount of time it would take the vehicle 103 to reach various possible rest stops of the listing of rest stops. Based on this prediction, in some examples the navigation application 114 may identify the rest stops reachable within the remaining amount of time the driver may drive before violating the HOS rules. Moreover, in some examples, the navigation application 114 may identify rest stops near the generated route where the driver could stop to comply with HOS rules based on the predicted amount of time it will take the driver to drive the route. Accordingly, the navigation application 114 may cause the user interface 108 to display the identified rest stops, e.g., via a map view as shown at FIG. 2, via a list view as shown at FIG. 3, via a combination map/list view, etc.

Furthermore, in some examples, the computer-readable instructions stored on the memory 112 may include instructions for carrying out any of the steps of the method 400 described in greater detail below with respect to FIG. 4, and/or any of the steps of the method 500 described in greater detail below with respect to FIG. 5.

The sever 104 may include one or more processors 118, such as one or more microprocessors, controllers, and/or any other suitable type of processor. The server 104 may further include a memory 120 (e.g., volatile memory or non-volatile memory) accessible by the one or more processors 118 (e.g., via a memory controller). The one or more processors 118 may interact with the memory 120 to obtain, for example, computer-readable instructions stored in the memory 120 for running applications stored in the memory. Additionally or alternatively, computer-readable instructions may be stored on one or more removable media (e.g., a compact disc, a digital versatile disc, removable flash memory, etc.) that may be coupled to the server 104 to provide access to the computer-readable instructions stored thereon. In some examples, the computer-readable instructions stored on the memory 120 may include instructions for accessing a routing or navigation database 122 storing maps, routes, or other navigation-related information suitable for generating navigation directions from an origin location to a destination location. Moreover, in some examples, the computer-readable instructions stored on the memory 120 may include instructions for accessing a rest stop database 124 storing indications of locations of various rest stops. For instance, the rest stop database 124 may include a listing of rest stops, their locations, and various characteristics of each rest stop, such as operating hours, whether parking is free, whether a parking lot at the rest stop includes parking spots suitable for large vehicles, whether food is available for purchase at the rest stop, whether lodging is available at the rest stop, etc. The server 104 may receive requests from the computing device 102 for data stored in the databases 122 and/or 124, or for data stored in the memory 120, and may send data to the computing device 102 based on these requests. Furthermore, in some examples, the computer-readable instructions stored on the memory 120 may include instructions for carrying out any of the steps of the method 400 described in greater detail below with respect to FIG. 4, and/or any of the steps of the method 500 described in greater detail below with respect to FIG. 5.

Figure 2:
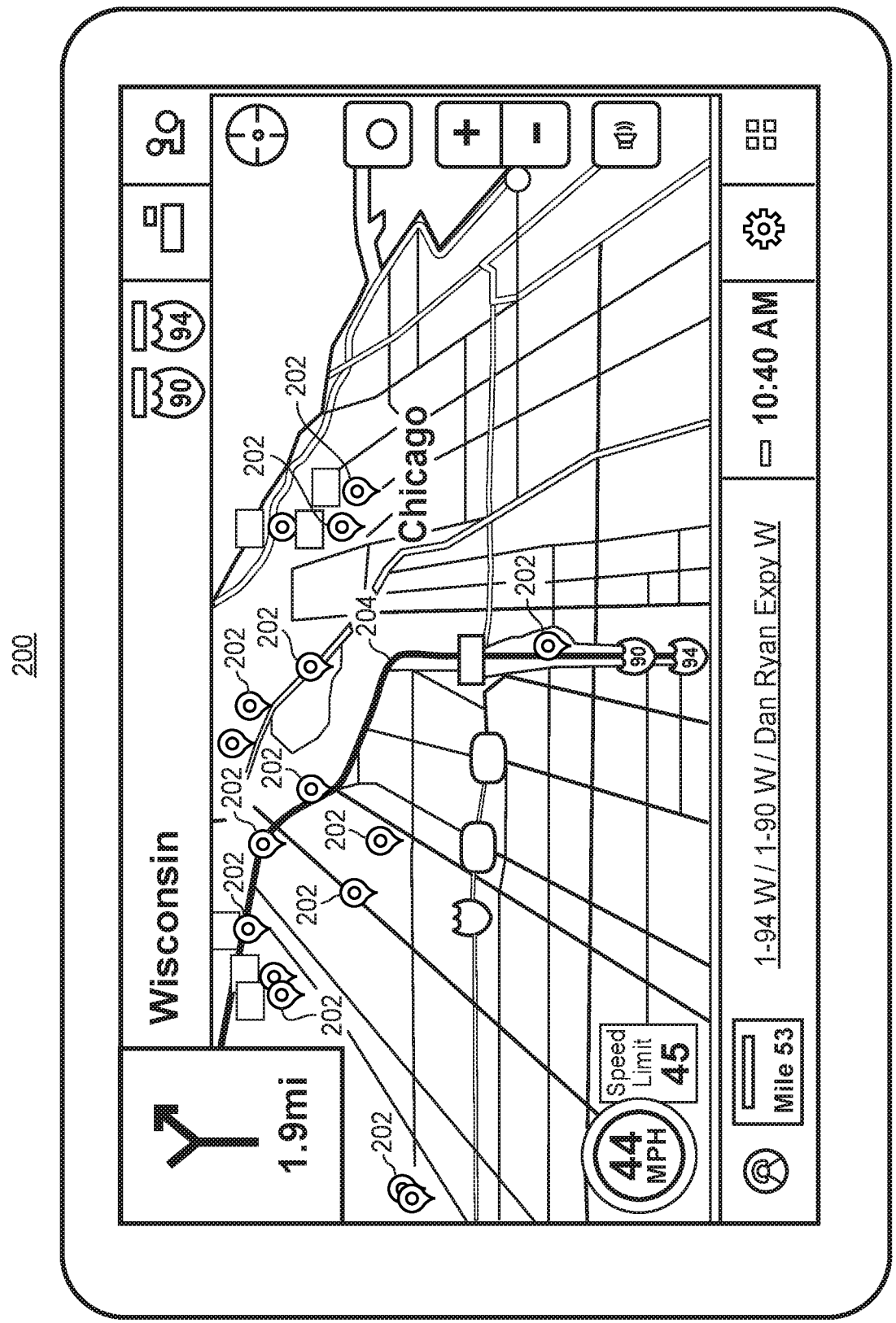
FIG. 2 illustrates an example user interface display for notifying a driver of locations at which the driver can stop in order to comply with HOS rules via a map view, in accordance with some embodiments.
Figure 3:
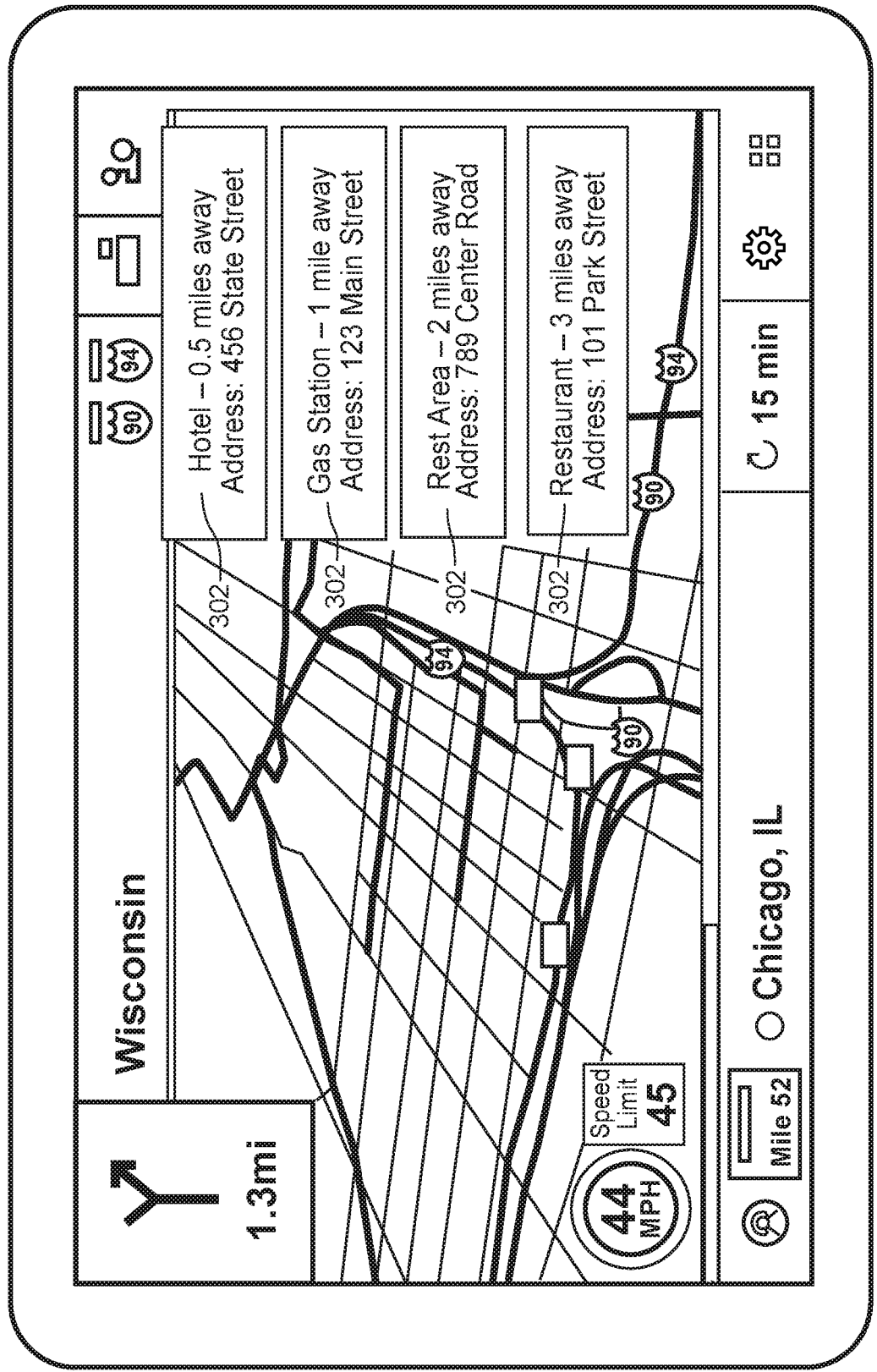
FIG. 3 illustrates an example user interface display for notifying a driver of locations at which the driver can stop in order to comply with HOS rules via a list view, in accordance with some embodiments.

FIG. 2 illustrates an example user interface display 200 for notifying a driver of locations at which the driver can stop in order to comply with HOS rules via a map view. As shown in FIG. 2, the user interface display 200 may display locations associated with one or more potential rest stops identified by the navigation application 114 as "pins" 202 on a digital map. As shown in the example user interface display 200, the pins 202 indicating potential rest stop locations may be displayed near an existing route 204 without altering the existing route 204.

FIG. 3 illustrates an example user interface display 300 for notifying a driver of locations at which the driver can stop in order to comply with HOS rules via a list view. As shown in FIG. 3, the user interface display may display a listing of potential rest stops 302, i.e., adjacent to a map view. The listing of potential rest stops 302 may include an indication of the type of rest stop (e.g., hotel, gas station, rest area, restaurant, parking lot, etc.), as well as an indication of the location of the rest stop, the distance of the rest stop from the current location of the vehicle 103, and/or the distance of the rest stop from the current route.

Figure 4:
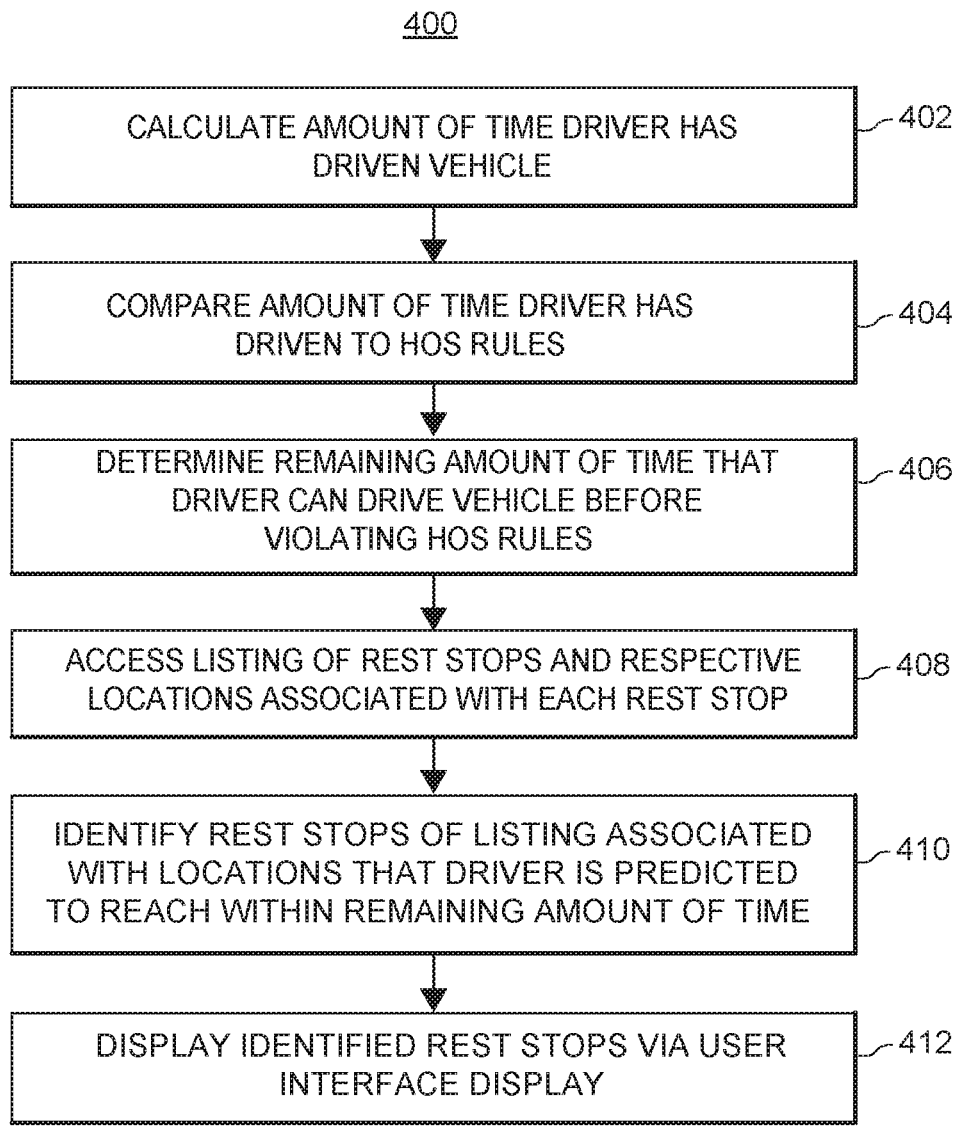
FIG. 4 is a flow diagram illustrating an example method for notifying a driver of locations at which the driver can stop in order to comply with HOS rules, in accordance with some embodiments.

FIG. 4 is a flow diagram illustrating an example method 400 for notifying a driver of locations at which the driver can stop in order to comply with HOS rules in accordance with some embodiments. One or more steps of the method 400 may be implemented as a set of instructions stored on a computer-readable memories 112 and/or 120 and executable on one or more processors 110 and/or 118.

At block 402 an amount of time that a driver has driven a vehicle (e.g., an amount of time the driver has driven the vehicle without a stop, a total amount of time the driver has driven the vehicle over a particular period of time, etc.) may be calculated. For instance, in some examples, calculating the amount of time that the driver has driven may include receiving indications from the driver (e.g., via a user interface) of times at which the driver starts driving and times at which the driver stops driving. For instance, a user may indicate when he or she starts driving, which may trigger a timer that is stopped when a user indicates that he or she has stopped driving. Additionally, in some examples, calculating the amount of time that the driver has driven would a stop may include receiving sensor data (e.g., motion sensor data, GPS data, etc.) associated with the vehicle and calculating the amount of time that the driver has driven based on the sensor data. For example, time periods over which sensor data likely indicates that the vehicle is in motion may be used to calculate the amount of time that the driver has driven.

At block 404, the amount of time that the driver has driven the vehicle may be compared to one or more HOS rules. For example, the HOS rules may include rules indicating a maximum number of hours that the driver is allowed to drive without a stop. For instance, a driver may be allowed to drive 5 hours without a stop (or 10 hours, or 12 hours, etc.) Additionally, for example, the HOS rules may include a maximum number of total hours that the driver is allowed to drive over a particular period of time. For instance, a driver may be allowed to drive 12 total hours over a 24-hour period, 50 total hours over a 7-day period, etc.

At block 406, a remaining amount of time that the driver can drive the vehicle before violating the one or more HOS rules may be determined (e.g., based on the comparison at block 404). For example, if the HOS rules state that a driver may only drive seven hours at a time without stopping, and the driver has already driven three hours without a stop, the driver must stop within four hours to comply with the HOS rules. As another example, if the HOS rules state that a driver may only drive 12 hours over a 24-hour period, if the driver has already driven 10 hours within a given 24-hour period, the driver may only drive two more hours in the rest of the 24-hour period.

At block 408, a listing of rest stops and respective locations (e.g., GPS coordinates) associated with each rest stop may be accessed. Rest stops may include, e.g., gas stations, state designated rest areas, convenience stores or other stores, lodging locations such as hotels or motels, restaurants, parking lots, etc. For example, the listing of rest stops and respective locations associated with each rest stop may be stored in a rest stop database. In some examples, the listing of rest stops that is accessed may be pre-filtered or may be filtered after accessing the listing, e.g., based on preferences or characteristics of a driver or a vehicle. For instance, if the vehicle is a large vehicle, such as a semi-truck, only rest stops having parking spaces large enough for the vehicle may be included in the filtered listing. As another example, only rest stops having free parking may be included in the filtered listing. As still another example, only rest stops that include food, or only rest stops that include lodging, may be included in the filtered listing.

At block 410, rest stops associated with locations that the driver is predicted to reach within the remaining amount of time may be identified. For example, if the HOS rules state that a driver may only drive seven hours at a time without stopping, and the driver has already driven three hours without a stop, the driver must stop within four hours to comply with the HOS rules. Accordingly, rest stops with locations predicted to be reached within four hours from the driver's currently location may be identified. As another example, if the HOS rules state that a driver may only drive 12 hours over a 24-hour period, if the driver has already driven 10 hours within a given 24-hour period, the driver may only drive two more hours in the rest of the 24-hour period. Accordingly, rest stops with locations predicted to be reached within two hours from the driver's current location may be identified.

For instance, predicting how long it will take a driver to reach a rest stop location may include calculating one or more possible routes between the vehicle's current location and each rest stop of the listing of rest stops, and predicting a time it will take the vehicle to reach each rest stop of the listing of rest stops, e.g., based on average driving speed associated with the driver, speed limits associated with routes to each rest stop of the listing of rest stops, current or predicted traffic associated with routes to each rest stop of the listing of rest stops, current or predicted weather associated with routes to each rest stop of the listing of rest stops, etc.

In some examples, the identified stops may be modified or updated as the driver drives. For instance, a rest stop location initially identified as reachable within two hours of a first location of the driver may be removed from the list of identified stops as the driver proceeds in the opposite direction. Similarly, if the driver drives more quickly than predicted, a further-away rest stop may be identified, but if the driver drives more slowly than predicted, a closer rest stop may be identified.

At block 412, the identified rest stops may be displayed via a user interface display. In some examples, the identified rest stops may be displayed without displaying a route to any of the rest stops. That is, the locations of identified rest stops may simply be displayed so that a user can decide whether to stop at any of the identified rest stops. For example, the identified rest stops may be displayed via a map view (e.g., as shown in FIG. 2) and/or a list view (e.g., as shown in FIG. 3) of the user interface display, or in a combination view including a map view as well as a list view. For example, the identified rest stops may be displayed including an indication of the distance or predicted travel time to reach the rest stop from the driver's current location. In some examples, the identified rest stops may be displayed based on receiving a request from the driver for an indication of locations at which the driver can stop in order to comply with HOS rules.

Figure 5:
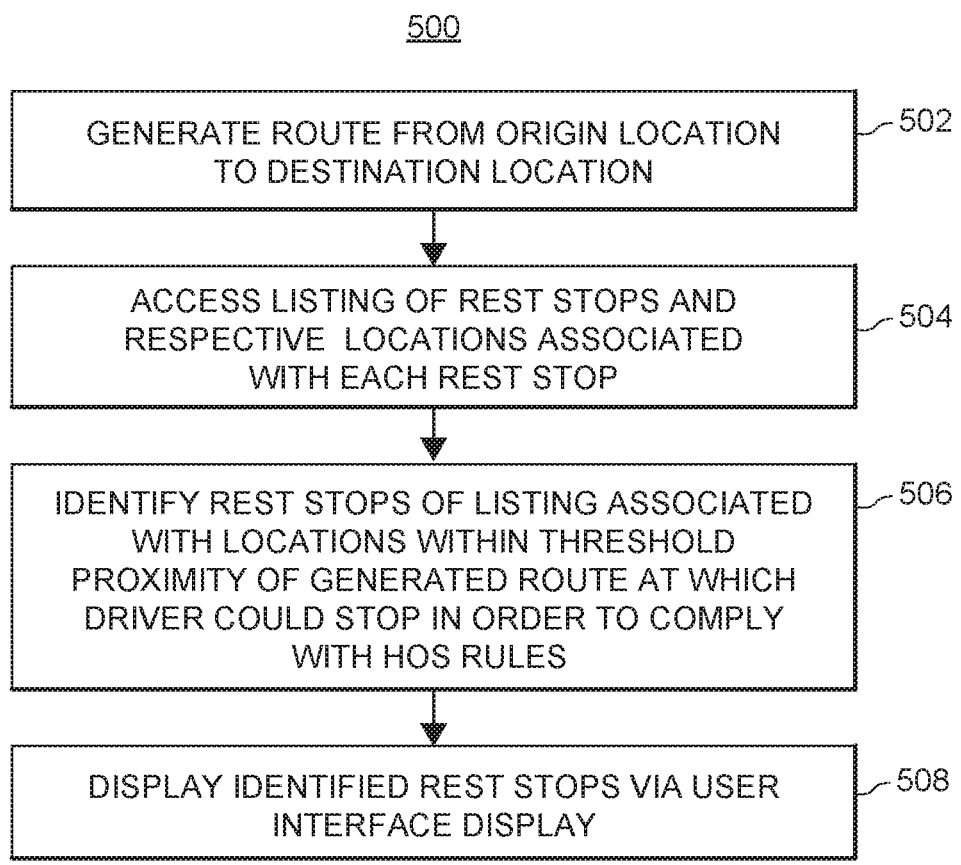
FIG. 5 is a flow diagram illustrating an example method for notifying a driver of locations near an existing route at which the driver can stop in order to comply with HOS rules, in accordance with some embodiments.

FIG. 5 is a flow diagram illustrating an example method 500 for notifying a driver of locations near an existing route at which the driver can stop in order to comply with HOS rules, in accordance with some embodiments. One or more steps of the method 500 may be implemented as a set of instructions stored on a computer-readable memories 112 and/or 120 and executable on one or more processors 110 and/or 118.

At block 502, a route from an origin location to a destination location may be generated. For example, a user may indicate an origin location and a destination location. In some examples, a user may indicate a destination location, and the user's current location (e.g., as determined by a location sensor, such as GPS sensor) may be used as the origin location. Generating the route may include accessing map data stored in a map database.

At block 504, a listing of rest stops and respective locations (e.g., GPS coordinates) associated with each rest stop may be accessed. Rest stops may include, e.g., gas stations, state designated rest areas, convenience stores or other stores, lodging locations such as hotels or motels, restaurants, parking lots, etc. For example, the listing of rest stops and respective locations associated with each rest stop may be stored in a rest stop database. In some examples, the listing of rest stops that is accessed may be pre-filtered or may be filtered after accessing the listing, e.g., based on preferences or characteristics of a driver or a vehicle. For instance, if the vehicle is a large vehicle, such as a semi-truck, only rest stops having parking spaces large enough for the vehicle may be included in the filtered listing. As another example, only rest stops having free parking may be included in the filtered listing. As still another example, only rest stops that include food, or only rest stops that include lodging, may be included in the filtered listing.

At block 506, one or more rest stops associated with locations within a threshold proximity of the generated route, at which the driver could stop in order to comply with one or more HOS rules, may be identified. For example, the threshold proximity may be a distance such as, e.g., within one mile of the generated route, within two miles of the generated route, within five miles of the generated route, etc. In some examples, the threshold proximity may be set by a user. For example, the HOS rules may include rules indicating a maximum number of hours that the driver is allowed to drive without a stop. For instance, a driver may be allowed to drive 5 hours without a stop (or 10 hours, or 12 hours, etc.) Additionally, for example, the HOS rules may include a maximum number of total hours that the driver is allowed to drive over a particular period of time. For instance, a driver may be allowed to drive 12 total hours over a 24-hour period, 50 total hours over a 7-day period, etc.

For instance, in some examples, identifying the rest stops at which the driver could stop in order to comply with the HOS rules may include predicting an amount of time for a driver to drive a vehicle along the route from the origin location or a current location to the destination location, and comparing the predicted amount of time for the driver to drive the vehicle along the route from the origin location or the current location to the destination location to the HOS rules to determine a number of rest stops and/or a frequency of rest stops required to comply with the HOS rules. For example, if the predicted amount of time for the driver to drive from the origin location or current location to the destination location is 15 hours, but the HOS rules state that a driver may only drive five hours at a time without stopping, at least two stops at a frequency of at least every five hours will be required to comply with the HOS rules. Accordingly, in this example, a first stop predicted to be reachable within five hours of the origin or current location (and within the threshold proximity of the generated route) may be identified, and a second stop predicted to be reachable within ten hours of the first stop (and within the threshold proximity of the generated route) may be identified.

Moreover, in some examples, identifying the rest stops at which the driver could stop in order to comply with the HOS rules may include calculating the amount of time that the driver has driven the vehicle (e.g., an amount of time the driver has driven the vehicle without a stop, a total amount of time the driver has driven the vehicle over a particular period of time, etc.). For instance, in some examples, calculating the amount of time that the driver has driven may include receiving indications from the driver (e.g., via a user interface) of times at which the driver starts driving and times at which the driver stops driving. For instance, a user may indicate when he or she starts driving, which may trigger a timer that is stopped when a user indicates that he or she has stopped driving. Additionally, in some examples, calculating the amount of time that the driver has driven would a stop may include receiving sensor data (e.g., motion sensor data, GPS data, etc.) associated with the vehicle and calculating the amount of time that the driver has driven based on the sensor data. For example, time periods over which sensor data likely indicates that the vehicle is in motion may be used to calculate the amount of time that the driver has driven. In any case, the amount of time that the driver has driven the vehicle may be compared to the HOS rules to determine a remaining amount of time that the driver can drive the vehicle before violating the HOS rules, and the rest stops may be identified based on which rest stops are within the threshold proximity of the route and predicted to be reached within the remaining amount of time. For example, if the HOS rules state that a driver may only drive seven hours at a time without stopping, and the driver has already driven three hours without a stop, the driver must stop within four hours to comply with the HOS rules. Accordingly, rest stops within the threshold proximity of the route and predicted to be reached within four hours may be identified. As another example, if the HOS rules state that a driver may only drive 12 hours over a 24-hour period, if the driver has already driven 10 hours within a given 24-hour period, the driver may only drive two more hours in the rest of the 24-hour period. Accordingly, rest stops within the threshold proximity of the route and predicted to be reached within two hours may be identified.

In some examples, the identified stops may be modified or updated as the driver proceeds along the route. For instance, if the driver travels the route more quickly than predicted, a rest stop further away than an initially-identified rest stop may be identified. Similarly, if the driver travels the road more slowly than predicted, a rest stop closer than an initially-identified rest stop may be identified.

At block 508, the identified rest stops may be displayed via a user interface display. In some examples, the identified rest stops may be displayed without modifying the existing route generated at block 502, and without otherwise generating/displaying a new route to any of the rest stops. That is, the locations of identified rest stops may simply be displayed so that a user can decide whether to stop at any of the identified rest stops. For example, the identified rest stops may be displayed via a map view (e.g., as shown in FIG. 2) and/or a list view (e.g., as shown in FIG. 3) of the user interface display, or in a combination view including a map view as well as a list view. For example, the identified rest stops may be displayed including an indication of the distance or predicted travel time to reach the rest stop from the route or from the driver's current location. In some examples, the identified rest stops may be displayed based on receiving a request from the driver for an indication of locations at which the driver can stop in order to comply with HOS rules.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method of notifying a driver of locations at which the driver can stop in order to comply with hours of service (HOS) rules without generating or displaying a navigation route based on the locations, comprising:
    calculating, by one or more processors, an amount of time that a driver has driven a vehicle;
    comparing, by the one or more processors, the amount of time that the driver has driven the vehicle to one or more HOS rules;
    determining, by the one or more processors, responsive to comparing the amount of time that the driver has driven the vehicle to the one or more HOS rules, a remaining amount of time that the driver can drive the vehicle before violating the one or more HOS rules;
    accessing, by the one or more processors, a listing of rest stops and respective locations associated with each rest stop of the listing of rest stops;
    identifying, by the one or more processors, one or more rest stops, of the listing of rest stops, associated with locations that the driver is predicted to reach within the remaining amount of time, without generating or displaying a navigation route based on any of the identified rest stops; and
    displaying, by the one or more processors, the identified rest stops via a map view of a user interface display.

2. The method of claim 1, wherein calculating the amount of time that the driver has driven includes:
    receiving, by the one or more processors, indications from the driver of times at which the driver starts driving and times at which the driver stops driving.

3. The method of claim 2, wherein the indications from the driver are received via a user interface.

4. The method of claim 1, wherein calculating the amount of time that the driver has driven includes:
    receiving, by the one or more processors, sensor data associated with the vehicle; and
    calculating, by the one or more processors, the amount of time that the driver has driven based on the sensor data associated with the vehicle.

5. The method of claim 4, wherein the sensor data associated with the vehicle includes motion sensor data associated with the vehicle.

6. The method of claim 1, wherein the one or more HOS rules include rules indicating one or more of: a maximum number of hours that the driver is allowed to drive without a stop, or a maximum number of total hours that the driver is allowed to drive over a particular period of time.

7. The method of claim 1, wherein identifying the one or more rest stops associated with locations that the driver is predicted to reach within the remaining amount of time includes:
    calculating, by the one or more processors, one or more possible routes between the vehicle's current location and each rest stop of the listing of rest stops; and
    predicting, by the one or more processors, a time it will take the vehicle to reach each rest stop of the listing of rest stops based on one or more of: an average driving speed associated with the driver, speed limits associated with routes to each rest stop of the listing of rest stops, current or predicted traffic associated with routes to each rest stop of the listing of rest stops, or current or predicted weather associated with routes to each rest stop of the listing of rest stops.

8. The method of claim 1, wherein displaying the identified rest stops via the user interface display includes displaying locations associated with the identified rest stops via a list view of the user interface display.

9. The method of claim 1, further comprising:
    receiving, by the one or more processors, a request from the driver for an indication of locations at which the driver can stop in order to comply with HOS rules; and
    displaying, by the one or more processors, the identified rest stops via a user interface display responsive to receiving the request.

10. A computer-implemented method of notifying a driver of locations at which the driver can stop in order to comply with hours of service (HOS) rules without generating or altering a navigation route based on the locations, comprising:
    generating, by one or more processors, a route from an origin location to a destination location, wherein generating the route is not based on locations associated with any of the rest stops;
    accessing, by the one or more processors, a listing of rest stops and respective locations associated with each rest stop of the listing of rest stops;
    identifying, by the one or more processors, one or more rest stops, of the listing of rest stops, associated with locations within a threshold proximity of the generated route, at which the driver could stop in order to comply with one or more HOS rules, without altering the generated route based on any of the identified rest stops; and
    displaying, by the one or more processors, the identified rest stops via a map view of a user interface display.

11. The method of claim 10, further comprising:
    predicting, by the one or more processors, an amount of time for a driver to drive a vehicle along the route from the origin location or a current location to the destination location;
    comparing, by the one or more processors, the predicted amount of time for the driver to drive the vehicle along the route from the origin location or the current location to the destination location to one or more HOS rules;

determining, by the one or more processors, responsive to comparing the predicted amount of time for the driver to drive the vehicle along the route from the origin location or the current location to the destination location to the one or more HOS rules, a number of rest stops and a frequency of rest stops required to comply with the one or more HOS rules; and wherein identifying the one or more rest stops, of the listing of rest stops, associated with locations within the threshold proximity of the generated route, at which the driver could stop in order to comply with the one or more HOS rules includes:

identifying one or more rest stops, of the listing of rest stops, associated with locations within the threshold proximity of the generated route based on the number of rest stops and the frequency of rest stops required to comply with the one or more HOS rules.

12. The method of claim 10, further comprising:

calculating, by one or more processors, an amount of time that the driver has driven the vehicle;

comparing, by the one or more processors, the amount of time that the driver has driven the vehicle to the one or more HOS rules;

determining, by the one or more processors, responsive to comparing the amount of time that the driver has driven the vehicle to the one or more HOS rules, a remaining amount of time that the driver can drive the vehicle before violating the one or more HOS rules; and wherein identifying the one or more rest stops, of the listing of rest stops, associated with locations within the threshold proximity of the generated route, at which the driver could stop in order to comply with the one or more HOS rules includes:

identifying one or more rest stops, of the listing of rest stops, associated with locations within the threshold proximity of the generated route based on the remaining amount of time that the driver can drive the vehicle before violating the one or more HOS rules.

13. The method of claim 12, wherein calculating the amount of time that the driver has driven includes:

receiving, by the one or more processors, indications from the driver of times at which the driver starts driving and times at which the driver stops driving.

14. The method of claim 13, wherein the indications from the driver are received via a user interface.

15. The method of claim 12, wherein calculating the amount of time that the driver has driven includes:

receiving, by the one or more processors, sensor data associated with the vehicle; and calculating, by the one or more processors, the amount of time that the driver has driven based on the sensor data associated with the vehicle.

16. The method of claim 15, wherein the sensor data associated with the vehicle includes motion sensor data associated with the vehicle.

17. The method of claim 10, wherein the one or more HOS rules include rules indicating one or more of: a maximum number of hours that the driver is allowed to drive without a stop, or a maximum number of total hours that the driver is allowed to drive over a particular period of time.

18. The method of claim 10, wherein displaying the identified rest stops via the user interface display includes displaying locations associated with the identified rest stops via a list view of the user interface display.

19. The method of claim 10, further comprising:

receiving, by the one or more processors, a request from the driver for an indication of locations at which the driver can stop in order to comply with HOS rules; and displaying, by the one or more processors, the identified rest stops via a user interface display responsive to receiving the request.

20. A system for notifying a driver of locations at which the driver can stop in order to comply with hours of service (HOS) rules without generating or displaying a navigation route based on the locations, the system comprising:

a user interface display;

one or more processors configured to interface with the user interface display and one or more memories; and the one or more memories storing non-transitory computer-readable instructions that, when executed by the one or more processors, cause the one or more processors to:

calculate an amount of time that a driver has driven a vehicle;

compare the amount of time that the driver has driven the vehicle to one or more HOS rules;

determine, responsive to comparing the amount of time that the driver has driven the vehicle to the one or more HOS rules, a remaining amount of time that the driver can drive the vehicle before violating the one or more HOS rules;

access a listing of rest stops and respective locations associated with each rest stop of the listing of rest stops;

identify one or more rest stops, of the listing of rest stops, associated with locations that the driver is predicted to reach within the remaining amount of time, without generating or displaying a navigation route based on any of the identified rest stops; and display the identified rest stops via a map view of the user interface display.

21. A system for notifying a driver of locations at which the driver can stop in order to comply with hours of service (HOS) rules without generating or altering a navigation route based on the locations, the system comprising:

a user interface display;

one or more processors configured to interface with the user interface display and one or more memories; and the one or more memories storing non-transitory computer-readable instructions that, when executed by the one or more processors, cause the one or more processors to:

generate a route from an origin location to a destination location, wherein generating the route is not based on any of the locations associated with rest stops;

access a listing of rest stops and respective locations for each rest stop of the listing of rest stops;

identify one or more rest stops, of the listing of rest stops, associated with locations within a threshold proximity of the generated route, at which the driver could stop in order to comply with one or more HOS rules, without altering the generated route based on any of the identified rest stops; and display the identified rest stops via a map view of the user interface display, without altering the generated route.

22. A non-transitory computer readable storage medium storing computer-readable instructions for notifying a driver of locations at which the driver can stop in order to comply with hours of service (HOS) rules without generating or displaying a navigation route based on the locations, that, when executed by one or more processors, cause the one or more processors to:

calculate an amount of time that a driver has driven a vehicle;
compare the amount of time that the driver has driven the vehicle to one or more HOS rules;
determine, responsive to comparing the amount of time that the driver has driven the vehicle to the one or more HOS rules, a remaining amount of time that the driver can drive the vehicle before violating the one or more HOS rules;
access a listing of rest stops and respective locations associated with each rest stop of the listing of rest stops;
identify one or more rest stops, of the listing of rest stops, associated with locations that the driver is predicted to reach within the remaining amount of time, without generating or displaying a navigation route based on the any of identified rest stops; and
display the identified rest stops via a map view of a user interface display.

23. A non-transitory computer readable storage medium storing computer-readable instructions for notifying a driver of locations at which the driver can stop in order to comply with hours of service (HOS) rules without generating or altering a navigation route based on the locations, that, when executed by one or more processors, cause the one or more processors to:
generate a route from an origin location to a destination location, wherein generating the route is not based on locations associated with any of the rest stops;
access a listing of rest stops and respective locations for each rest stop of the listing of rest stops;
identify one or more rest stops, of the listing of rest stops, associated with locations within a threshold proximity of the generated route, at which the driver could stop in order to comply with one or more HOS rules, without altering the generated route based on any of the identified rest stops; and
display the identified rest stops via a map view of a user interface display, without altering the generated route.

* * * * *